Sept. 13, 1966  T. CALDWELL  3,272,343
APPARATUS FOR SEPARATING LIQUIDS OR SOLIDS FROM LIQUIDS
Filed July 3, 1963
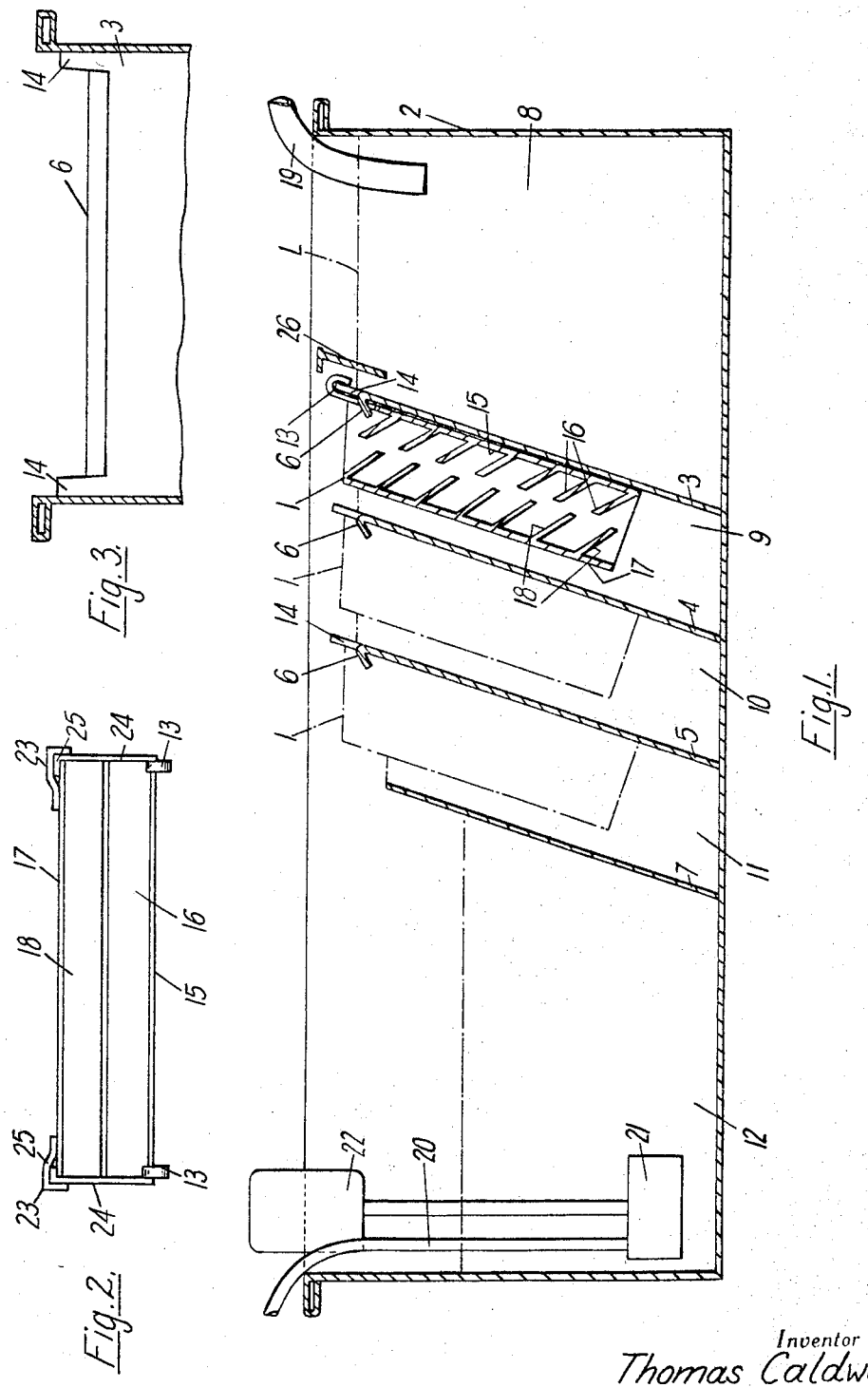
Inventor
Thomas Caldwell
By Polachek & Saulsbury
Attorney

United States Patent Office 3,272,343
Patented Sept. 13, 1966

3,272,343
APPARATUS FOR SEPARATING LIQUIDS OR SOLIDS FROM LIQUIDS
Thomas Caldwell, Mugdock, near Milngavie, England, assignor to Smith Fullerton Limited, Glasgow, Great Britain, a British company
Filed July 3, 1963, Ser. No. 294,462
Claims priority, application Great Britain, July 7, 1962, 26,128/62
5 Claims. (Cl. 210—521)

This invention relates to apparatus for the purpose of separating solids from a mixture with liquids or for separating a mixture of liquids of different specific gravities, and especially for separating metal particles from coolants for machine tools being ground, such coolants normally comprising an emulsion of oil and water.

According to the present invention separating apparatus for the purpose aforesaid comprises a conduit for the mixture to be separated and a series of fins in the conduit projecting into the path of flow through the conduit, and forming with the conduit a succession of pockets in the latter having their mouths facing against the direction of flow.

Preferably, the conduit has a second series of fins opposite the first mentioned series and projecting into said paths of flow and adapted to deflect the mixture into said pockets.

Preferably also, there is a plurality of said conduits mounted on baffles which divide a tank into compartments, the baffles forming weirs over which the mixture flows successively into the conduits.

An embodiment of the invention will now be described, by way of example, with reference to the accompanying drawing, in which:

FIG. 1 is a sectional elevational view of separating apparatus according to the invention in a tank,
FIG. 2 is a plan view of the separating apparatus, and
FIG. 3 is a detail view.

Referring to the drawing, separating apparatus according to the invention consists of three open-ended rectangular boxes generally indicated at 1. The boxes 1 are upright, and are located within a rectangular tank 2. The tank 2 has three baffles 3, 4 and 5 interspaced longitudinally of and extending fully across the tank 2. Each baffle at its upper end is spaced downwardly from the top of the tank, and has a portion intermediate its sides bent forwardly and downwardly to form a weir 6. A fourth baffle 7 is provided, so that the tank is divided into five compartments, a reservoir or intake compartment 8, separating compartments 9, 10 and 11, and a discharge compartment 12.

Each box 1 is suspended from its baffle by a pair of hooks 13 which engage over the upstanding side portions 14 of the baffles and the rear walls 15 of the boxes abut the baffles. Each box 1 has on its rear wall 15 a first series of seven fins 16 projecting into the path of flow which are upwardly inclined at an angle of about 45° to the rear wall 15 and interspaced throughout the length of the box 1. The opposite or front wall 17 of each box 1 has a second series of similar fins 18 which project into the path of flow and are downwardly inclined at an angle of 45° to the front wall 17, and are staggered relative to the fins 16. The fins 16 and 18 extend the full width of each box 1 and for ease of manufacture are of the same depth front to rear, and at their free ends terminate just short of the transverse medial plane of the box. Alternatively, however, the fins of one series may project into the spaces between fins of the other series.

In use, for example with a tool grinding machine, the coolant containing particles of waste metal resulting from a grinding operation flows through a pipe 19 into the compartment 8. When the level of the coolant reaches the chain-dotted line L it flows over the first weir 6 into the upper end of the first or rearmost box 1, and follows a sinuous course over the baffles 17 and 18 through the box 1 into the compartment 9. The coolant level rises in the compartment 9 until the coolant overflows through the next box 1 into the compartment 10. The coolant then overflows through the last box 1 into the compartment 11 and then overflows into the compartment 12. The coolant is then discharged through a pipe 20 by a pump 21 driven by a motor 22 and is ready for further use, metal particles having separated therefrom in the boxes 1.

During the passage of the coolant through the tank, the following action has been found to take place.

Any metal particles, which are so heavy as to sink and remain sunk in the coolant, collect on the bottom of the compartment 8. A collapsible bag or other removable receptacle may therefore be provided on the bottom of the compartment 8 for easier removal of these heavy particles.

As the coolant passes through the boxes 1, the fins 18 act as deflectors which direct the coolant into the pockets formed by the fins 16 with the boxes 1. The fins cause relatively slow-speed eddies to form in said pockets and most, if not all, of the remaining particles separate out and are trapped in said pockets.

The coolant also carries with it a percentage of lighter particles, and, due to a tendency for the coolant to rise up through the boxes 1, these lighter particles, which have not already separated out, collect in the pockets formed between the lower faces of the fins 18 and the front walls 17 of the boxes 1.

The boxes 1 are easily removed from the tank for cleaning, when necessary, simply by lifting them upwards clear of the lips 6. In a modification, the boxes 1 may be closed at the lower end and have an outlet at the lower end of their front walls 17.

To facilitate cleaning of each box 1, the front wall 17 with its fins 18 is withdrawable from the remainder of the box. As shown in FIG. 2, the front wall 17 has at each side a joggled angle member 23 and the side walls 24 of the box 1 have inturned flanges 25 which slide into the spaces between the members 23 and the wall 17.

When, for example, the apparatus is used for coolant with a grinding machine having a 60 grit wheel, suitable dimensions for the tank are 36 inches long, 24 inches wide and 20 inches high, with seven fins in each series, and a supply of coolant at a rate of about 150 gallons per hour, the baffles being about 4 inches apart. In a larger model, the width is 48 inches, and the supply of coolant is increased to about 300 gallons per hour. With such arrangements, the degree of separating out of the metal particles has in some cases been found to be so exceedingly high that in ratio only 10 parts out of a million parts of the particle content remained in the coolant after treatment.

The dimensions of the tank, the number of boxes, the number of fins in each box, and the rate of flow of the mixture may be varied to suit the mixture to be treated, but the rate of flow of the mixture should be such as to allow the particles to settle in the pockets in accordance with the principle of Stokes Law relating to the fall of a sphere of predetermined density and diameter in a liquid of known viscosity.

Various modifications may be made without departing from the scope of the invention as defined in the appended claims. For example, the tank may have an inlet pipe to the compartment 8 secured thereto, and the compartment 12 may have an outlet pipe through which the liquid may flow into a separate collecting tank from which it is pumped instead of being pumped from the compartment 12. Also, the tank may be closed at the top. It is also possible to reduce the overall size of the apparatus or obtain increased capacity for a given size, by making the tank circular and the baffles and boxes of frustro-conical shape.

In FIG. 1 of the drawing, the numeral 26 indicates a shallow baffle in the compartment 8 which projects above the top of the baffle 3 and prevents or reduces the possibility of foam on top of the mixture in the compartment 8 being carried over the weir 6 on the baffle 3.

The apparatus may also be used for separating a mixture of liquids of different specific gravities.

The tank and boxes may conveniently be made throughout from galvanised sheet metal.

As a result of the invention, there is provided separating apparatus which in comparison with previously known separating apparatus is simple to use, light in weight, relatively easy and inexpensive to manufacture and maintain, is easily cleaned, has no moving parts, takes up little space, and is highly efficient.

I claim:

1. Separating apparatus for separating solids from a mixture with liquids or for separating a mixture of liquids of different specific gravities, and especially for separating metal particles from coolants for machine tools being ground, said apparatus comprising a tank for the mixture, a plurality of upstanding baffles dividing the tank into a plurality of compartments and forming weirs over which the mixture may flow successively from one compartment to the next, a plurality of upright conduits, each between two of said baffles, and having inlets at their upper ends open to the mouths of the respective weirs and having outlets at their lower ends open to the respective compartments, and an upright passage between the outlet of each conduit and the next weir in the direction of flow of the mixture, and in each conduit, first and second upright and opposed series of fins extending transversely of the conduit and projecting into the flow path, the fins of the first series being upwardly inclined and forming with the conduit a succession of pockets having their mouths facing upwardly against the direction of flow, and the fins in the second series being downwardly inclined and arranged to deflect the mixture into said pockets.

2. Separating apparatus as claimed in claim 1, in which each conduit comprises a substantially rectangular open-ended box having one of its walls mounting the first series of fins and abutting a baffle and having its opposed wall mounting the second series of fins and spaced from the next baffle, and withdrawably supported on the first mentioned baffle by hooks.

3. Separating apparatus as claimed in claim 2, in which the wall of the box mounting the second series of fins is removable from the remainder of the box so as to facilitate cleaning.

4. Separating apparatus as claimed in claim 1, in which there are seven fins in each series, the fins in each series lie at an angle of about 45° to the respective walls and are about four inches apart, and the fins in the second series are staggered relative to the fins in the first series, and the tank is about thirty six inches long, twenty four inches wide and twenty inches high.

5. Separating apparatus as claimed in claim 1, in which a shallow upright baffle is provided in the tank, said baffle lying adjacent and in front of the first baffle in the direction of flow and projecting above the level of said first baffle so as to prevent or reduce the possibility of foam on top of the mixture being carried over said first baffle.

References Cited by the Examiner

UNITED STATES PATENTS

| | | | |
|---|---|---|---|
| 704,022 | 7/1902 | Friesdorf | 55—444 |
| 1,190,863 | 7/1916 | Corne et al. | 210—521 X |
| 2,451,144 | 10/1948 | Bradshaw | 55—308 |
| 2,896,743 | 7/1959 | Aubrey | 410—416 X |

REUBEN FRIEDMAN, *Primary Examiner.*

F. A. SPEAR, *Assistant Examiner.*